(12) United States Patent
Saito et al.

(10) Patent No.: US 6,554,474 B2
(45) Date of Patent: Apr. 29, 2003

(54) HYDRODYNAMIC BEARING DEVICE

(75) Inventors: Shoichi Saito, Hachioji (JP); Hiromichi Sakano, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/981,767

(22) Filed: Oct. 18, 2001

(65) Prior Publication Data

US 2002/0051589 A1 May 2, 2002

(30) Foreign Application Priority Data

Oct. 31, 2000 (JP) ........................... 2000-333781

(51) Int. Cl.⁷ ............................. F16C 32/06; F16C 33/74
(52) U.S. Cl. ..................... 384/107; 384/119; 384/130
(58) Field of Search ............................. 384/100, 107, 384/114, 119, 120, 130, 131, 132

(56) References Cited

U.S. PATENT DOCUMENTS

| | | | | |
|---|---|---|---|---|
| 5,403,098 A | * | 4/1995 | Yasui et al. ............ | 384/115 |
| 5,520,038 A | | 5/1996 | Clark et al. ............ | 72/75 |
| 5,700,547 A | * | 12/1997 | Shibata et al. ......... | 384/114 |
| 6,157,515 A | * | 12/2000 | Boutaghou .............. | 384/100 |
| 6,338,574 B1 | * | 1/2002 | Shimizu et al. ........ | 384/115 |

FOREIGN PATENT DOCUMENTS

JP          2574666       10/1996

* cited by examiner

*Primary Examiner*—Thomas R. Hannon
(74) *Attorney, Agent, or Firm*—Scully, Scott, Murphy & Presser (57) ABSTRACT

A hydrodynamic bearing device of a shaft, a sleeve rotatably supporting this shaft, wherein a herringbone groove is formed at a predetermined part of an inner periphery wall face of the sleeve, and, a thrust receiver supporting a thrust side of the shaft fixed to a lower face of the sleeve, thereby sealing predetermined lubricant, wherein a spiral groove which is narrower in groove width and shallower in depth than the herringbone groove, and which is oriented to the thrust receiver in a rotation direction of the shaft, is formed on inner periphery wall face of the sleeve.

12 Claims, 6 Drawing Sheets

HYDRODYNAMIC BEARING DEVICE

CROSS-REFERENCE TO RELATED APPLICATIONS

This application is based upon and claims the benefit of priority from the prior Japanese Patent Application No. 2000-333781, filed Oct. 31, 2000, the entire contents of which are incorporated herein by reference.

BACKGROUND OF THE INVENTION

1. Field of the Invention

The present invention relates to a hydrodynamic bearing device composed of a shaft and a sleeve for rotatably supporting this shaft, wherein a dynamic pressure generating groove is provided on a surface of the shaft or sleeve. More particularly, the present invention relates to a means for preventing leakage of a fluid (for example, lubricant) in a hydrodynamic bearing.

2. Description of the Related Art

In general, a hydrodynamic bearing is composed of a shaft, a sleeve for rotatably supporting the shaft, a thrust receiver fixed to a lower face of the sleeve, and a lubricant filled in the sleeve. When the shaft is rotated, a dynamic pressure is generated with the lubricant in a radial direction due to an action of a herringbone groove provided on a wall face of the inner periphery of the sleeve. Then, the shaft rotates in non-contact with the wall face of the inner periphery of the sleeve. In a thrust direction, the shaft rotates while a tip end of the shaft comes into point contact with a thrust receiver via a lubricant, and frictional energy loss is minimized.

However, there is a problem that the lubricant tends to move, by a variety of factors, towards a sleeve opening end, (hereinafter referred to as "movement force") and the leakage of the lubricant from the wall face of the inner periphery of the sleeve occurs. Some of the above factors are as follows.

1. The capillary phenomenon occurs in a gap between a shaft and a sleeve, which shifts the lubricant vertically (in a vertical direction), and the movement force occurs.
2. A lubricant rotates with shaft rotation, and the lubricant to which centrifugal force is applied is subjected to a restriction on the wall face of the inner periphery of the sleeve. Thus, the vertical movement force occurs.
3. A lubricant is swelled due to rotational heat generation, and the vertical movement force acts on a lubricant.
4. A pressure difference occurs inside a bearing due to inaccuracies in the precision of a herringbone groove, and an upward or downward movement force acts on a lubricant. A herringbone groove free of generating the pressure difference requires high precision.

In the case where the movement of the lubricant caused by any of these factors cannot be restrained, a lubricant leakage occurs from the sleeve opening end. Then, the lubricant in a gap between the shaft and the wall face of the inner periphery of the sleeve decreases, the shaft and sleeve come into contact with each other, and an oscillation noise is increased. As a result, the service life of the bearing itself is significantly reduced. Therefore, how well the hydrodynamic bearing prevents the lowering of performance or reliability caused by the leakage of the lubricant is an important problem in the hydrodynamic bearing.

Conventionally, a means for preventing the leakage of a lubricant of such a hydrodynamic bearing is proposed as follows. For example, a dynamic pressure type hydrodynamic bearing described in Japanese Patent No. 2574666 comprises a shaft, a sleeve for rotatably supporting the shaft, a thrust receiver fixed to the lower face of the sleeve, and a lubricant filled in the sleeve, wherein a herringbone groove is formed at a proper site in the thrust direction on the sleeve inner periphery wall face.

This herringbone groove in the vicinity of a sleeve opening end is asymmetrical in a thrust direction, and is short in distance at a side proximal to the sleeve opening end. In addition, in the vicinity of the sleeve opening end, a tapered peripheral groove is provided at the shaft so that the axial diameter is shorter at the portions of the shaft distant from the herringbone groove.

With the above described construction and features, in the prior art, when the shaft is rotated, a return force, towards the inside of the bearing, acts due to a pressure difference in the asymmetrical herringbone groove in the vicinity of the sleeve opening end, thereby preventing the leakage of the lubricant. In addition, this return force acts on the lubricant at the tapered portion of the shaft so that leakage of the lubricant can be further prevented.

However, in recent years, a disk recording/reproducing apparatus is thinner, and is higher in density, a motor for use in the recording/reproducing apparatus becomes thinner, and the oscillation precision of the shaft that is a center of disk rotation requires higher precision. Due to this thinning, the lengths of the motor shaft and sleeve are reduced. Thus, if an effective span of a radial bearing is determined so as not to impair the oscillation precision of this shaft, it becomes difficult to ensure a space for a means for preventing the leakage or evaporation of the lubricant in a dynamic bearing device and a space for holding the lubricant in the bearing.

In a conventional means for preventing the leakage or evaporation of the lubricant in a dynamic pressure bearing, a space for a length in the thrust direction of the substantially tapered portion provided at a part of the shaft cannot be provided, thus making it impossible to push back the lubricant sufficiently. Thus, the advantageous effect cannot be attained. Alternatively, in the case where the above length is defined such that the advantageous effect of the substantially tapered portion can be attained, the effective span of the radial bearing is reduced. Thus, there occurs a failure that a shaft oscillation range is increased.

In addition, in the case where the herringbone groove in the vertical direction of the bearing is made asymmetrical, preventing leakage or the like, the asymmetrical degree of such a herringbone groove cannot be sufficiently obtained. Thus, the advantageous effect cannot be attained. Alternatively, in order to attain the advantageous effect with a short asymmetrical degree, high precision is required in groove processing. Thus, there is a problem that higher costs are inevitable.

It is an object of the present invention to provide a dynamic pressure bearing device (hydrodynamic bearing device) capable of sufficiently preventing the evaluation and leakage of the lubricant in order to improve the reliability of a hydrodynamic bearing for a thin motor.

BRIEF SUMMARY OF THE INVENTION

In order to solve the foregoing problem and achieve the above object, the present invention takes the following means. That is, according to a first aspect of the present invention, there is proposed a hydrodynamic bearing device having: a shaft; a sleeve rotatably supporting the shaft, wherein a herringbone groove is formed at a predetermined part of an inner periphery wall face of the sleeve, and a thrust receiver supporting a thrust side of the shaft fixed to a lower face of the sleeve, thereby sealing predetermined lubricant; wherein a spiral groove which is narrower in groove width and shallower in depth than the herringbone groove, and which is oriented to the thrust receiver in the rotation direction of the shaft, is formed on the inner periphery wall face of the sleeve. Then, the force along the first spiral groove acts on the lubricant in a sealed space due to a pumping action of the first spiral groove, and the lubricant is oriented to the thrust receiver via the herringbone groove.

In addition, the herringbone groove and the first spiral groove is a groove that is formed so as to be superimposed on the wall face of the inner periphery of the sleeve.

The above first spiral groove is a groove that is formed over the entire wall face of the inner periphery of the sleeve.

There is proposed the previously described hydrodynamic bearing device, wherein a second spiral groove having a narrower groove width and a shallower depth than the herringbone groove, the second spiral groove being oriented in the sleeve opening end direction in the rotation direction of the shaft, is further formed on the wall face of the inner periphery of the sleeve, and wherein the movement force of the lubricant toward the thrust receiver due to the first spiral groove can be restrained by the second spiral groove.

In addition, there is proposed the previously described hydrodynamic bearing device, wherein, in the sleeve, a large diameter peripheral groove is formed in the vicinity of the opening end, and in the inner diameter of the sleeve, the inner diameter of the opening end side close to the large diameter peripheral groove is greater than that of the thrust receiver side. The large diameter peripheral groove maintains swelling of the lubricant due to a temperature change.

Still furthermore, there is proposed the previously described hydrodynamic bearing device, wherein, in the first spiral groove, the groove at the opening end side is constructed to be wider in groove width and deeper in depth than that at the thrust receiver side close to the large diameter peripheral groove. The spiral groove at the opening end side is formed wide and deep, whereby a gap between the shaft and the sleeve is further increased. The capillary phenomenon can be greatly restrained, and a lubricant returns to the large diameter peripheral groove via this spiral groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B show two examples of the spiral groove of this sleeve portion, where

DETAILED DESCRIPTION OF THE INVENTION

Hereinafter, the present invention will be described in detail by way of showing a plurality of embodiments.
(First Embodiment)

A first embodiment of the present invention will be described with reference to FIGS. 1 to 6.

Figure 1:
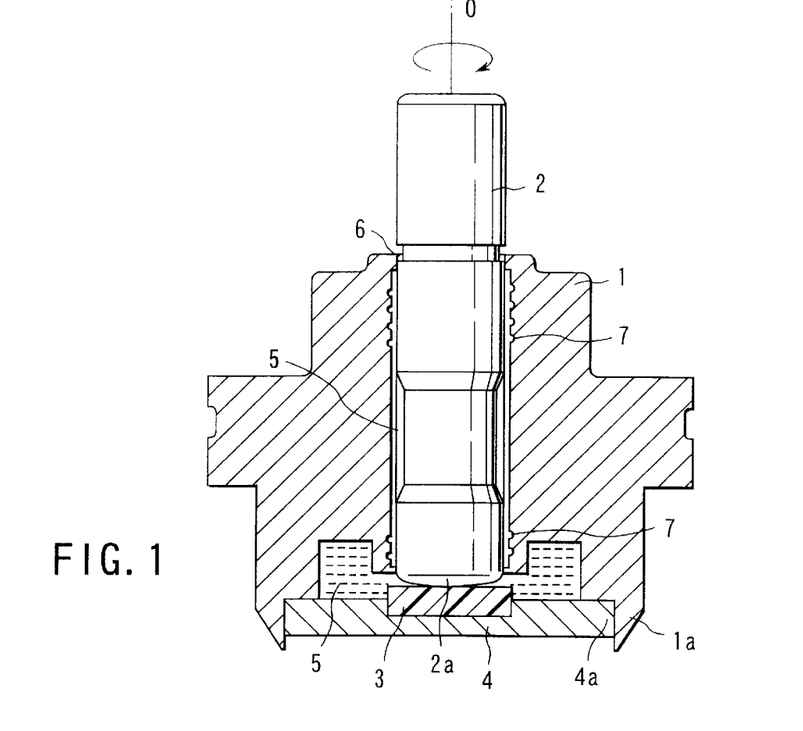
FIG. 1 is a longitudinal cross section view showing a construction of a hydrodynamic bearing device according to a first embodiment of the present invention.
Figure 2:
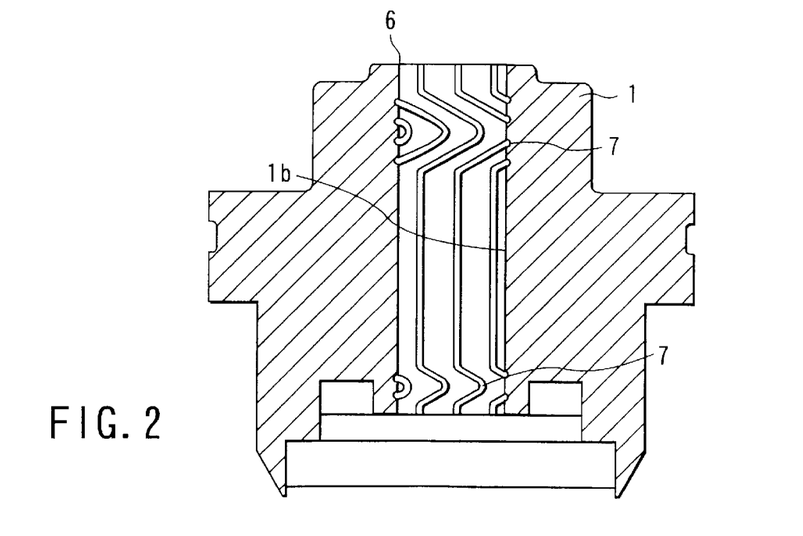
FIG. 2 is a longitudinal cross section view showing a sleeve of the hydrodynamic bearing device according to the first embodiment.
Figure 3:
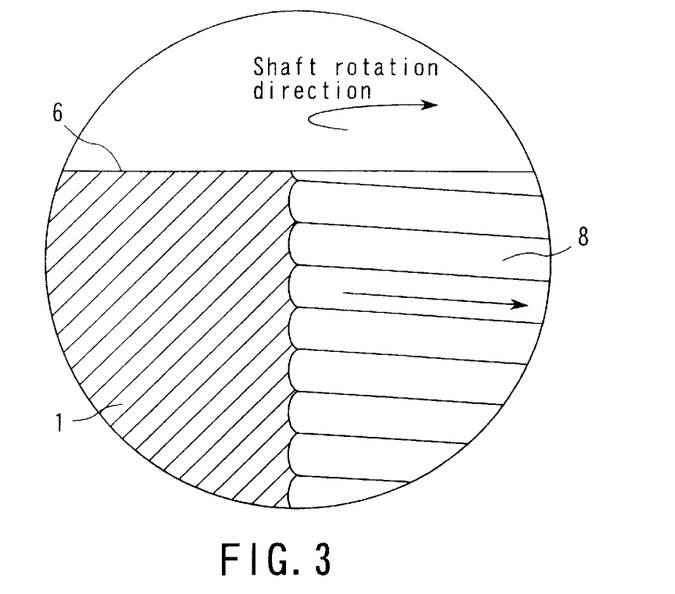
FIG. 3 is an enlarged cross section view showing a spiral groove of this sleeve portion, a shaft rotation direction, and a flow of a lubricant in the spiral groove in an enlarged manner.
Figure 4A:
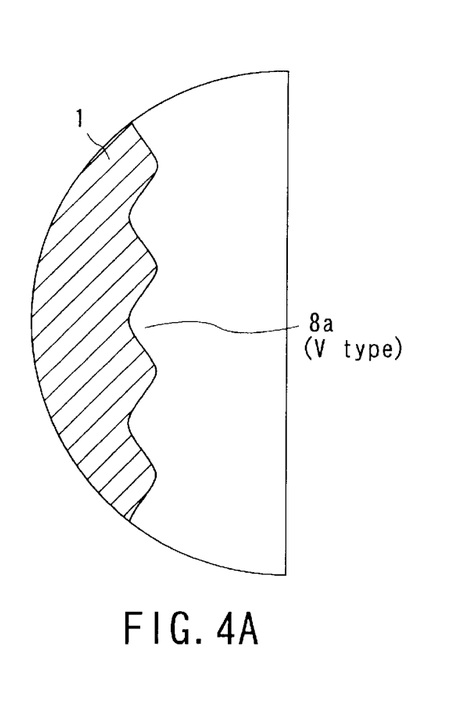
FIG. 4A is an enlarged cross section view showing an example of this spiral groove.
Figure 4B:
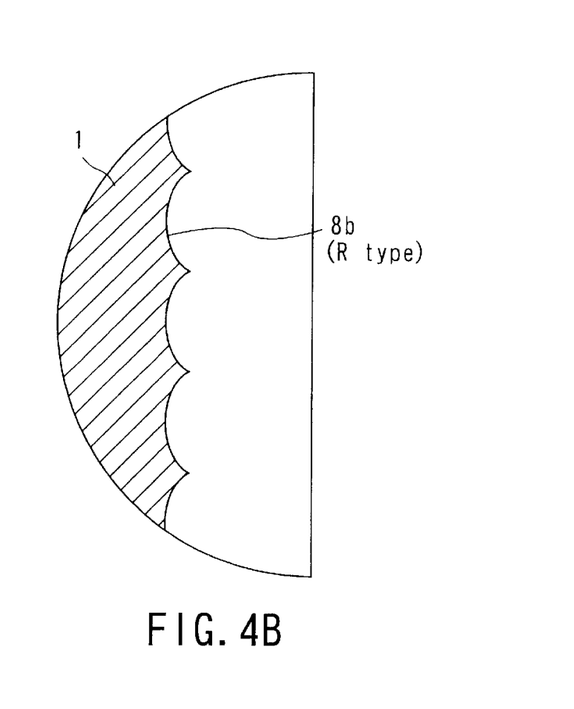
FIG. 4B is an enlarged cross section showing an example of another spiral groove.
Figure 5:
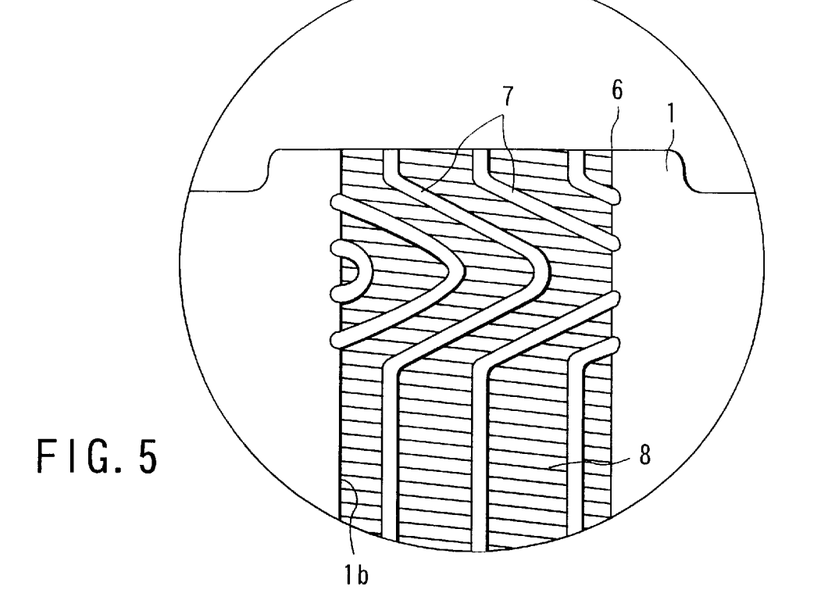
FIG. 5 is an enlarged view showing an interior wall face of the sleeve according to the first embodiment.
Figure 6:
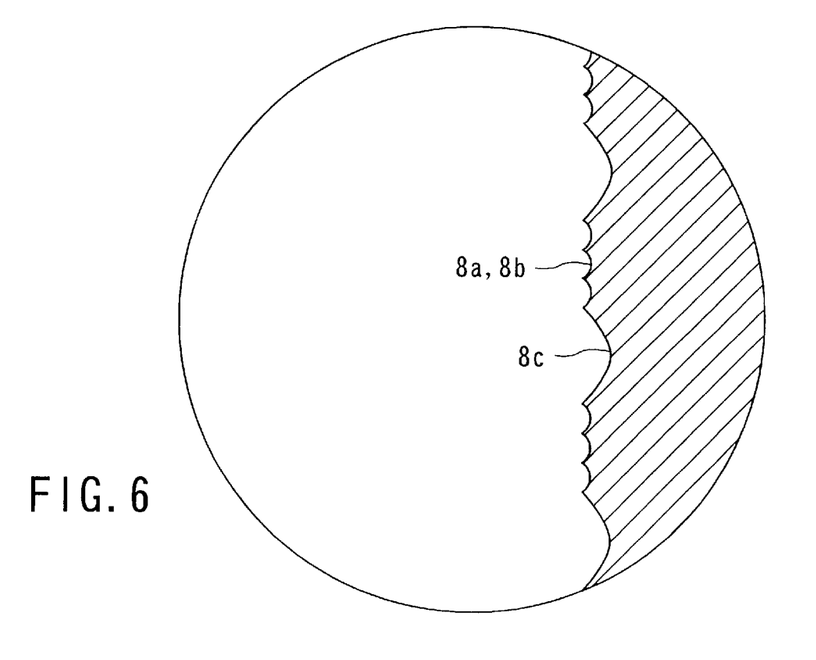
FIG. 6 is an enlarged cross section view showing a combination example of two types of spiral grooves with different pitches.

FIGS. 1 to 6 each shows essential parts of a hydrodynamic bearing device according to the first embodiment. FIG. 1 shows a longitudinally sectional structure of the entire hydrodynamic bearing device. FIG. 2 shows a herringbone groove 7 formed on its interior wall face at the cross section of only the sleeve 1 other than a shaft. FIG. 3 shows a first spiral groove 8 formed on the interior wall face of the sleeve and a shaft rotation direction, where the flow of the lubricant in the groove is indicated by the arrow. FIGS. 4A and 4B show two examples of the spiral groove. FIG. 5 shows an interior wall face of the sleeve in an enlarged manner. FIG. 6 shows an example when a plurality of different spiral grooves are combined with each other.

In FIG. 1, around a sleeve 1 that is a fixing member, a shaft 2 is rotatably inserted, and a shaft tip end 2a is formed at a sufficiently large R (radius) relevant to the outer diameter of the shaft 2 so as to abut against a disk shaped thrust receiver 3. The above shaft 2 is made of stainless steel in which hard martensite based burning has been carried out. The above thrust receiver 3 is molded of a material of which a slippery material such as molybdenum disulfide is filled while a super engineering plastic (Super Enpla) such as polyamide made of a material having high temperature and heat resistance properties in which characteristics do not change due to a rotational frictional heat, is defined as a base material, and inserted into the concavity portion formed in the center of a disk-shaped thrust receiver substrate 4.

An outer diameter peripheral end 4a of a thrust receiver substrate 4 is engagingly fixed to a sleeve large diameter section 1a so that a sealed space is provided by the sleeve 1, shaft 2, and thrust receiver substrate 4. In this sealed space, for example, a fluorine based lubricant is injected as a lubricant 5 up to the vicinity of the sleeve opening 6.

At plural parts in the axial direction of an inner periphery wall face 1b of the sleeve 1 shown in FIG. 2, symmetrical herringbone grooves 7 as grooves for dynamic pressure generation are formed in plurality at a depth of about 4 to 9 μm. The herringbone grooves 7 each are formed on the interior wall face of the sleeve from the upper sleeve opening to the lower sleeve bottom. In the vicinity of a respective one of the top and bottom, a mountain shape is partially formed such that the mountain shape has a top toward the rotation direction.

Although not shown in detail in FIG. 2, a fine groove shown in an enlarged manner in FIG. 3 is provided. Here, "a first spiral groove" is referred to as "a fine groove" relevant to the herringbone groove 7. In this way, when the shaft 2 is assembled in the sleeve 1 in which a first spiral groove (fine groove) 8 is further formed along an interior wall face of the sleeve, and this shaft 2 rotates in the rotation direction indicated by the arrow that is in clockwise direction viewed from the side of the sleeve opening 6, a lubricant oil flows along the inside of the fine groove 8 in the direction indicated by the arrow shown in FIG. 3. This spiral fine groove 8 is a fine, spiral groove that is narrower in groove width and shallower in depth than the herringbone groove 7, and in detail, that is oriented in the direction of the thrust receiver 3 at a depth of about 0.1 to 0.8 microns.

In the fine groove 8 constructed as described above, the following action takes place during operation. That is, there is provided a bearing having one end of the sleeve 1 sealed. Thus, in a still state, a gap between the shaft 2 and the sleeve inner periphery wall face 1b is small, and the lubricant 5 moves toward a sleeve opening 6 due to capillary action. However, by the presence of the spiral groove 8, a gap between the shaft 2 and the sleeve inner periphery wall face 1b broadens, and the capillary action is decreased. Thus, this movement force is restrained and reduced.

In a rotating state, the lubricant 5 also rotates with rotation of the shaft 2, and a pressure difference occurs due to the resultant centrifugal force, the swelling caused by a frictional heat generated by rotation of the lubricant 5, and distortion in precision of the herringbone groove 7. Thus, the movement force towards a sleeve opening end 6 acts on this lubricant 5.

The movement force toward the thrust receiver 3 acts on lubricant 5 that exists in a gap (sealed space) between the sleeve inner periphery wall face 1b and the shaft 2, due to "a pumping action" of the spiral groove 8 oriented in the direction indicated by the arrow shown in FIG. 3, i.e., in the direction of the thrust receiver 3, via the herringbone groove 7 along the spiral groove 8.

Therefore, the spiral groove 8 is provided under the above described specification condition, whereby the movement force of the lubricant 5 toward the sleeve opening 6 can be restrained.

Further, the movement force toward the thrust receiver 3 generated at the spiral groove 8 is increased by the movement force of the lubricant 5 to the sleeve opening end 6, whereby the movement force acts on only the sealed thrust receiver 3. Therefore, a balance with an internal pressure of the sealed space is obtained, and the lubricant 5 is maintained in a sealed space between the shaft 2 or sleeve 1 and the thrust receiver 3 without moving in excess of a predetermined distance, thus making it possible to reliably prevent the leakage of the lubricant 5.

The internal pressure of the sealed space acts on a shaft tip end 2a, and serves to reduce a pressure between the shaft 2 and the thrust receiver 3. Moreover, due to the movement force toward the sleeve opening end 6, even if a large movement force toward the thrust receiver 3 is generated at the spiral groove 8, the setting can be easily normalized under the cut processing condition for the spiral groove 8. Thus, the distortion in precision of the herringbone groove 7 can be lowly restrained, and the bearing can be fabricated at a low cost.

The herringbone groove 7 that is a dynamic pressure generating portion and the spiral groove 8 that is a leakage preventing means are formed on the same inner periphery wall face so as to be superimposed on the sleeve inner periphery wall face 1b. Thus, the effective span of the bearing can be extended as compared with the bearing length, and the oscillation precision of the shaft is improved.

As described previously, this spiral groove 8 is narrower in groove width and shallower in groove depth than the herringbone groove 7, and thus, an advantageous effect caused by the generation of a dynamic pressure of the herringbone groove 7 is not degraded.

This first spiral groove 8 includes a variety of grooves such as a V shaped spiral groove 8a whose cross section is formed in a substantial V shape as illustrated in FIG. 4A or another Ripple shaped type spiral groove 8b formed in a substantial semi-arc shape as illustrated in FIG. 4B.

When these V shaped and ripple shaped spiral grooves 8a and 8b are processed to be cut on the sleeve inner periphery wall face 1, the sleeve 1 is first rotated. Then, a specific cutting tool is moved in a direction opposite to the thrust direction of the sleeve 1, and all or part of the sleeve inner periphery wall face 1b may be provided as a kerf for cut processing. Alternatively, as shown in FIG. 6, a spiral groove 8c in pitch that is deeper and coarser than a kerf for finish processing may be further provided on the kerf for finish processing of the sleeve inner periphery wall face 1b.

In addition, the spiral groove 8 is formed on the same inner periphery wall face so as to be superimposed on the herringbone groove 7 on the sleeve inner periphery wall face 1b formed at the herringbone groove 7, as shown in FIG. 5.

In a conventional apparatus, in general, a liquid-like lubricant interposed in a gap between a shaft and a sleeve inner periphery wall face moves to a sleeve opening due to the capillary phenomenon that occurs in a still state of a bearing having one end of a sleeve sealed thereon; the lubricant rotates with shaft rotation while in a rotating state and rotates with a centrifugal force; and the lubricant moves to an opening end due to an occurrence of a pressure difference caused by the swelling due to the resultant frictional heat and a distortion in the precision of a herringbone groove. In contrast, according to the first embodiment, a pumping action of a first spiral groove characterized by moving in the thrust direction, the pumping action being carried out by the first embodiment, makes it possible to move the lubricant in a sealed space to the thrust receiver via the herringbone groove.

Due to this first spiral groove, a gap between a shaft and a sleeve increases and decreases the capillary phenomenon, and the tendency of the lubricant to move to a sleeve opening is restrained. Thus, the movement force of the lubricant significantly acts in the thrust receiver direction. In addition, the movement of the lubricant is well balanced, and the lubricant is maintained in a sealed space. This makes it possible to reliably prevent the leakage of the lubricant, even if the cost required to improve the processing precision of the conventional herringbone groove is restricted.

Furthermore, the first spiral groove is provided on the sleeve inner periphery wall face to coincide with that of the face on which the herringbone groove is formed. This contributes to a reduction of the effective span of the bearing and improvement of the oscillation precision of the shaft. In addition, the first spiral groove is narrower in groove width and shallower in groove depth than the herringbone groove. Thus, the advantageous effect caused by a generation of a dynamic pressure at the herringbone groove is not degraded.

As a result of the above implementation, there can be provided a hydrodynamic bearing device capable of preventing the leakage of lubricant. The "leakage" of lubricant used here may be broadly construed to be inclusive of that which evaporates to the outside.

The above described first embodiment may be modified and carried out as follows, whereby the same or more advantageous effect can be expected. For example, a variety of shapes of the first spiral groove may be formed without being limited to a V shape or a ripple shape.

Each element may be made of a proper material as long as such material conforms to the associated functional specifications.

In addition, another lubricant may be used without being limited to the shown lubricant oil as long as the lubricant meets the similar characteristics in the groove shape illustrated here. The employed lubricants and the groove specifications (such as shape, pitch, or depth) are closely related with each other, and thus, these lubricants may be combined by properly adjusting them.

(Second Embodiment)

Now, a second embodiment of the present invention will be described with reference to FIGS. 7 to 9.

Figure 7:
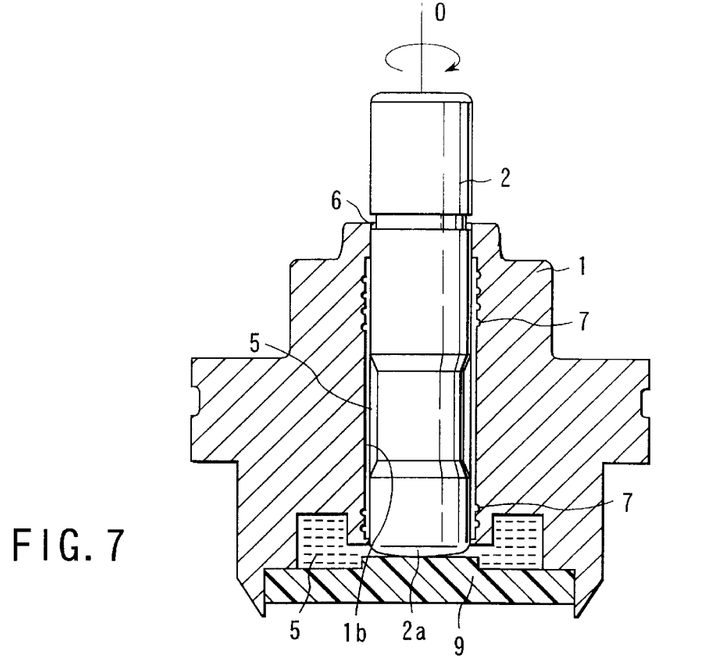
FIG. 7 is a longitudinal cross section view showing a construction of a hydrodynamic bearing device according to a second embodiment of the present invention.
Figure 8:
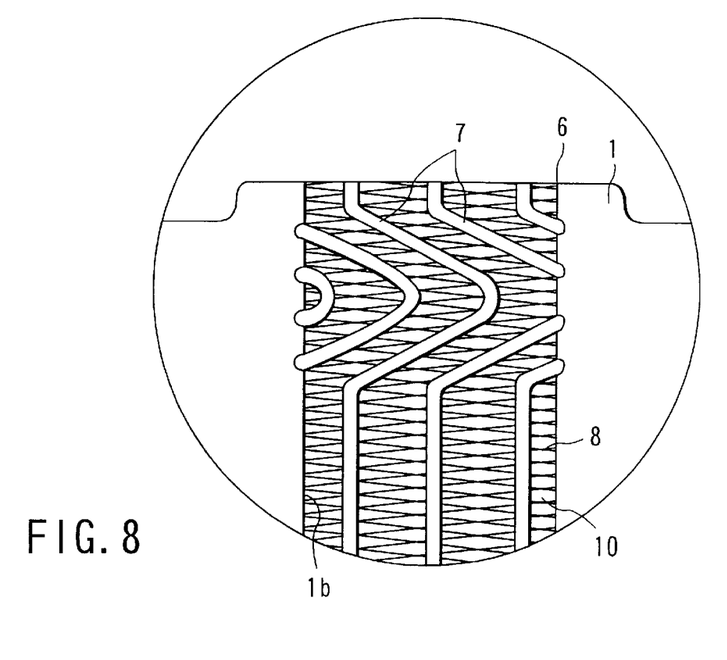
FIG. 8 is an enlarged view showing an interior wall face of a sleeve of the hydrodynamic bearing device according to the second embodiment.

FIGS. 7 and 8 each show a construction of essential parts of a hydrodynamic bearing device according to the second embodiment. FIG. 7 shows a sectional structure of the entire bearing device. FIG. 8 shows a sleeve interior wall face in an enlarged manner. FIG. 9 shows spiral grooves 8 and 10, a shaft rotation direction, and a flow of the lubricant 5.

Hereinafter, the features of the present embodiment different from those of the previously described first embodiment will be described. As shown in FIG. 7, a thrust receiver 9 is a member obtained by the thrust receiver 3 and thrust receiver substrate 4 of the first embodiment being integrally molded of super engineering plastic.

In FIG. 8, a herringbone groove 7 for dynamic pressure generation similar to that according to the first embodiment, a spiral groove 8 similar to that according to the first embodiment, and a spiral groove 10 (second spiral groove) that is different from that according to the first embodiment, are formed on a sleeve inner periphery wall face 1b, and the fineness of the spiral groove is further increased.

Figure 9:
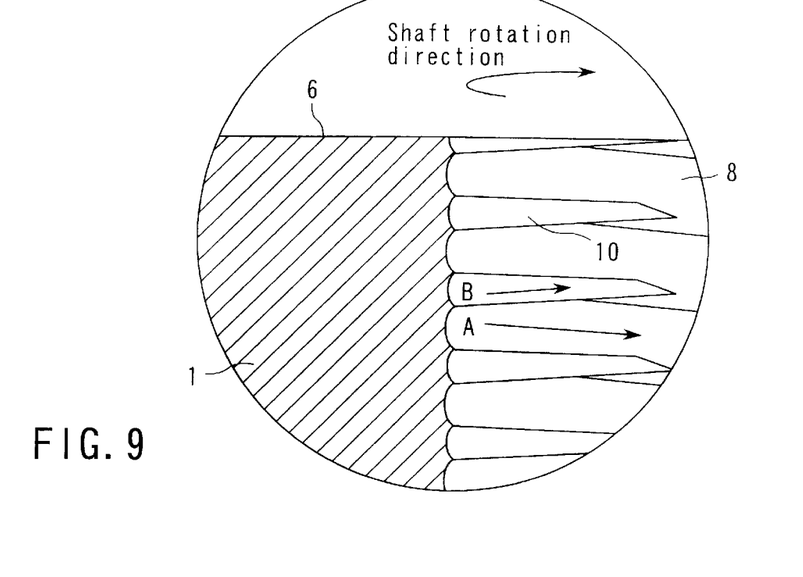
FIG. 9 is an enlarged cross section view showing a spiral groove of this sleeve portion, a shaft rotation direction, and a flow of the lubricant in the spiral groove.

That is, as in the first embodiment, the spiral groove 8 is formed toward the diagonal downward direction in the shaft rotation direction indicated by the arrow A shown in FIG. 9, a spiral groove 10 (second spiral groove) oriented horizontally or slightly upward of the shaft rotation direction indicated by the arrow B is formed so as to be superimposed on the sleeve inner periphery wall face 1b of the herringbone groove 7, i.e., so as to cross at the same position.

These spiral grooves 8 and 10 are moved in both directions relevant to a dedicated tool in a thrust direction while the sleeve 1 is rotated when the sleeve inner periphery wall face 1b is processed to be cut in a manufacturing process, whereby the grooves are formed as a kerf for cut processing at the entirety or part of the sleeve inner periphery wall face 1b. The spiral groove 8 is formed when the dedicated tool is moved upwardly in FIG. 7, and the spiral groove 10 is formed when the dedicated tool is moved downwardly in FIG. 7.

In the hydrodynamic bearing device according to the second embodiment, as compared with each movement force of the lubricant 5 described in the first embodiment, the movement force toward the thrust receiver 9 caused by the spiral groove 8 is increased. In the case where there occurs a need to further increase the sealing force in a sealed space, the spiral groove 1 is narrower in width and shallower in depth than the spiral groove 8, thereby obtaining a balance with the movement force of the lubricant 5 toward the sleeve opening end 6 so as to stably maintain the lubricant 5 on the shaft 2 and the sleeve inner periphery wall face 1b.

In the spiral groove constructed as described above, the following action occurs during operation. However, a detailed description will be given with respect to the action and advantageous effect identical to those according to the first embodiment.

In the case where the movement force towards the direction of the thrust receiver 9 is increased by the action of the spiral groove 8 toward the direction of the thrust receiver 9, the spiral groove 10 oriented in the direction of the sleeve opening 6 provided as described above restrains the movement force toward the direction of the thrust receiver 9.

In addition, the number of spiral grooves is increased, the number of portions at which a gap between the shaft 2 and the sleeve 1 broadens is increased, and the effect of the capillary phenomenon is decreased. Thus, the movement force caused by the capillary phenomenon of the lubricant 5 or the like is restrained, and the movement quantity is further reduced.

As has been described above, according to the second embodiment, two types of spiral grooves 8 and spiral groove 10 whose forming directions are slightly different from each other are formed to be superimposed on the sleeve inner periphery wall face 1b on which the herringbone groove 7 has been formed so that these grooves cross each other. In this manner, many more spiral grooves and the lubricant 5 are often interposed in a wide gap, and thus, the capillary phenomenon is decreased. As a result, there can be provided a hydrodynamic bearing device capable of reliably preventing the leakage of the lubricant 5.

The second embodiment may be modified and carried out as follows, and an advantageous effect similar to that according to the first embodiment can be expected. For example, the above described balance may be properly adjusted in pitch or at an angle of a groove to be formed.

(Third Embodiment)

Figure 10:
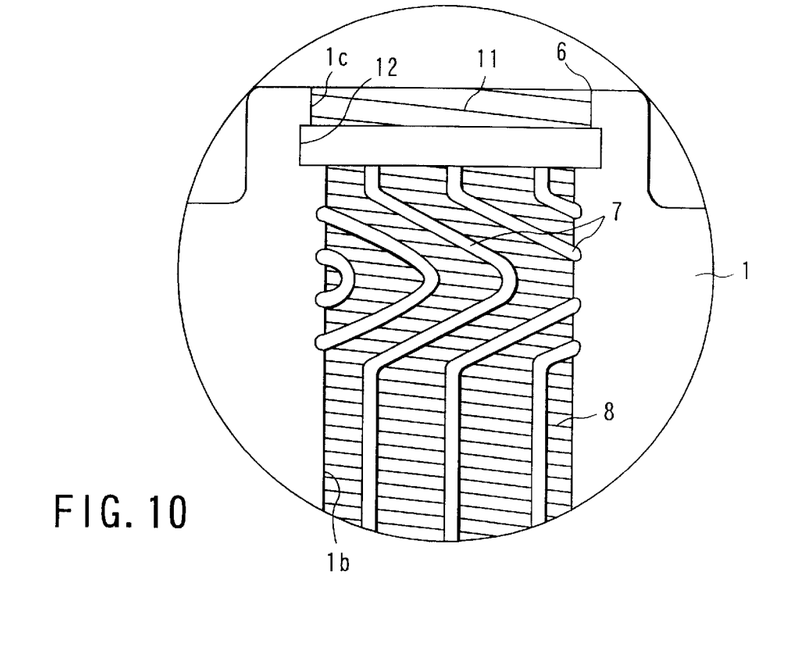
FIG. 10 is an enlarged view showing an interior wall face of a sleeve of a hydrodynamic bearing device according to a third embodiment of the present embodiment.
Figure 11:
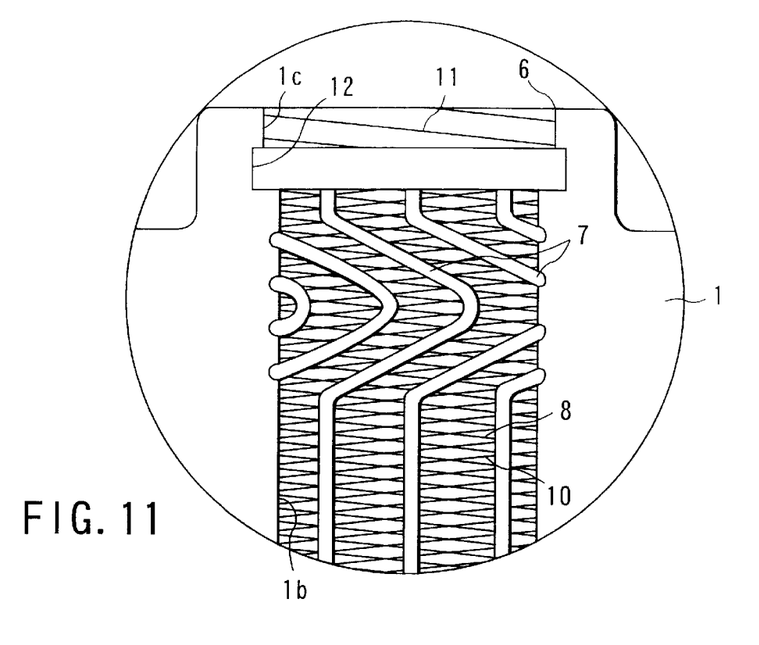
FIG. 11 is an enlarged view showing an example of another spiral groove on the interior wall face of this sleeve.
Figure 12:
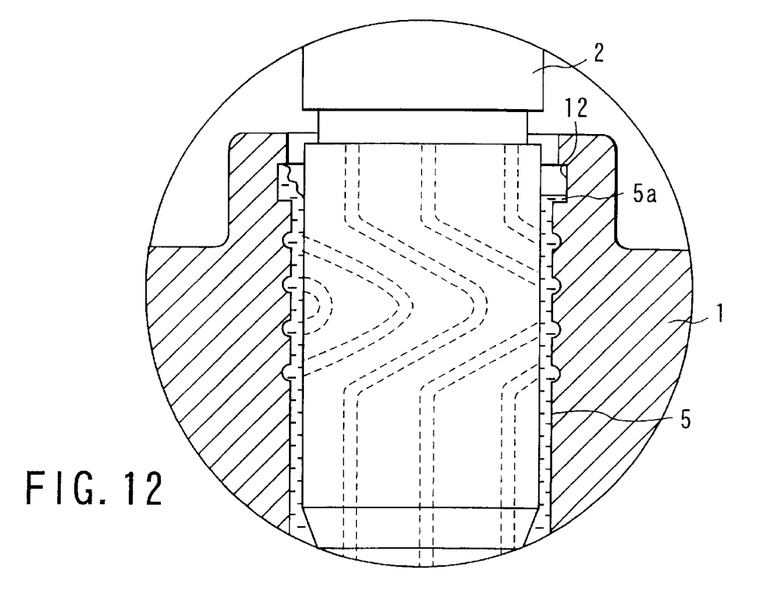
FIG. 12 is a longitudinal cross section view showing essential parts of a hydrodynamic bearing device that contains a lubricant in a gap between a shaft and a sleeve.

Now, a third embodiment of the present invention will be described with reference to FIGS. 10 to 12. FIGS. 10 and 11 each show essential parts of the sleeve 1 according to the third embodiment. FIG. 12 illustrates a gap between the shaft 2 and the sleeve 1 in an enlarged manner to show the sleeve 1 in cross section, a herringbone groove on its inner periphery face, and a state of the lubricant at the periphery of the shaft 2.

As compared with the previously described hydrodynamic bearing device according to the first or second embodiment, in a hydrodynamic bearing device embodied here, a sleeve inner periphery wall face 1b in the vicinity of a sleeve opening 6 is slightly larger in diameter than the sleeve inner periphery wall face 1b having the herringbone groove 7 formed thereon, and is wider in groove width than the spiral groove 8 of the sleeve inner periphery wall face 1b. A spiral groove 11 is provided at a depth of about 0.5 to 10 $\mu$m in a direction indicated by the arrow C when the groove is rotated in a clock wise direction viewed from the sleeve opening end side. A large diameter inner periphery groove section 12 formed to be deeply recessed in the radial direction of the sleeve opening is further provided between this sleeve inner periphery wall face 1b and a sleeve inner periphery wall face 1c provided at an upper portion of this wall face.

These spiral grooves 8 and spiral grooves 10 that are difference therefrom or the spiral grooves 11 different from the spiral grooves 8 or 10 or the like can be obtained by rotating the sleeve 1 and changing the movement velocity or cutting depth of a specific tool relevant to the thrust direction of the sleeve 1 when the sleeve inner periphery wall faces 1b and 1c are processed to be cut in a manufacturing process. In this way, two or three different types of spiral grooves are formed. Then, these grooves are provided as a kerf for cut processing on all or part of the sleeve inner periphery wall face 1b and on the sleeve inner periphery wall face 1c.

At each of the grooves constructed as described above, the following action occurs during operation. That is, the inner periphery wall face 1b in the vicinity of a sleeve opening end is defined in diameter that is slightly greater than the sleeve inner periphery wall face 1b having the herringbone groove 7 formed thereon. A wide, deep spiral groove 11 is provided as a second spiral groove, and thus, a gap between the shaft 2 and the sleeve inner periphery wall face 1c is further increased, and a capillary phenomenon is significantly restrained.

In the case where a temperature change occurs during stoppage, the movement force generated by the swelling of the lubricant 5 or the movement force generated in a capillary phenomenon in a gap between the sleeve inner periphery wall face 1b having the herringbone groove 7 engraved thereon and the shaft 2 cannot be restrained by utilizing rotation. However, as shown in FIG. 12, upper layers 5a and 5b caused by the swelling of the lubricant 5 are maintained in this large diameter peripheral groove 12. Therefore, the lubricant 5 does not reach the vicinity of the upper part of the sleeve opening 6, and thus, no leakage occurs.

Then, the shaft 2 is rotated, and the lubricant 5 (for example, upper layers 5a and 5b of the lubricating oil) further moves from the large diameter peripheral groove 12 that is an oil stop due to centrifugal force or the like. Even in the case where the entire hydrodynamic bearing device is inclined, this lubricant can be returned to the large diameter peripheral groove 12 via this wide, deep spiral groove 11. Thus, oil that is a lubricant 5 from the sleeve opening end 6 does not leak. In addition, no leakage occurs even during rotation at high temperatures, and thus, the shaft rotates normally without any burn.

Further, since a substantially tapered section is absent at the shaft 2 as in the prior art, a gap between the inner periphery wall face in the vicinity of the sleeve opening end and the shaft 2 can be reduced as compared with the prior art. Thus, evaporation from this gap can be reduced.

As has been described above, according to the third embodiment, a remarkably wide, deep spiral groove having its diameter that is slightly greater than the sleeve inner periphery wall face having the herringbone groove formed thereon, is provided on the inner periphery wall face in the vicinity of the sleeve opening end, thereby making it possible to ensure that a gap between the shaft and the sleeve further broadens, and a capillary phenomenon can be greatly restrained. In addition, even if the movement force generated by the swelling of the lubricant due to a temperature change when rotation is inactive or the movement force generated with a capillary phenomenon in a gap between the inner periphery wall face and its shaft, the wall face existing on a face on which the herringbone groove is formed, cannot be reduced by utilizing rotation, the large diameter peripheral groove maintains this swelling in the large diameter peripheral groove section. Thus, no leakage of the lubricant occurs.

Then, even if the shaft is rotated, and there occurs a further movement of lubricant from this large diameter peripheral groove to the vicinity of the sleeve opening, the lubricant returns to the large diameter peripheral groove section via the wide, deep spiral groove. Thus, no leakage of the lubricant itself occurs.

As a result, there can be provided a hydrodynamic bearing device capable of reliably preventing the leakage of lubricant and operating while a lubricant oil is maintained in proper amount.

Further, the present invention may be modified and carried out as follows, and the advantageous effect similar to that according to the above described embodiment can be expected. For example, the cross section of the large diameter peripheral groove section 12 may be formed in a proper shape such as a semi-arc shape (ripple shape) without being limited to a deeply recessed shape in a radial direction.

Otherwise, various modifications can be made without departing from the spirit of the present invention.

In the foregoing, the present invention has been described by way of showing illustrative embodiments. The specification includes the following invention.

According to the present invention, there can be provided a hydrodynamic bearing device comprising: a shaft; a sleeve for rotatably supporting the shaft; and a thrust receiver fixed to a lower face of the sleeve, the thrust receiver supporting a thrust direction of the shaft and sealing a predetermined lubricant, wherein the lubricant is filled in a gap between an inner periphery wall face of the sleeve and the shaft and in a sealed space formed by the lower face of the sleeve and the thrust receiver; and wherein a spiral groove (fine groove) that is narrower in groove width and shallower in groove depth than the herringbone groove and that is oriented to the thrust receiver direction in the rotation direction of the shaft is provided on the inner periphery wall face of the sleeve so as to be superimposed on a face identical to a face on which the herringbone groove is formed.

According to the present invention, there can be provided a hydrodynamic bearing device comprising: a shaft; a sleeve for rotatably supporting the shaft; a herringbone groove formed in the inner periphery wall face at a proper site in the thrust direction of the sleeve; and a thrust receiver fixed to a lower face of the sleeve, the thrust receiver supporting the thrust direction of the shaft, and sealing a lubricant, the lubricant being filled in a sealed space formed by the lower face of the sleeve and the thrust receiver, wherein a spiral groove that is narrower in groove width and shallower in groove depth than the herringbone groove and a spiral groove that is oriented in the thrust receiver direction in the rotation direction of the shaft are provided on the inner periphery wall face of the sleeve so as to be superimposed on a face identical to a face on which the herringbone groove is formed.

According to the present invention, there can be provided a hydrodynamic bearing device comprising: a shaft; a sleeve for rotatably supporting the shaft; and a thrust receiver fixed to a lower face of the sleeve, the thrust receiver supporting a thrust direction of the shaft and sealing a predetermined lubricant, wherein the lubricant is filled in a gap between the inner periphery wall face of the sleeve and the shaft and a sealed space formed at the lower face of the sleeve and the thrust receiver, and wherein a spiral groove that is narrower in groove width and shallower in groove depth than the herringbone groove and a spiral groove that is oriented in the thrust receiver direction in the rotation direction of the shaft are provided on the inner periphery wall face of the sleeve so as to be superimposed on a face identical to a face on which the herringbone groove is formed.

According to the present invention, there can be provided a hydrodynamic bearing device comprising: a shaft; a sleeve for rotatably supporting the shaft; a herringbone groove formed in the inner periphery wall face at a proper site in the thrust direction of the sleeve; and a thrust receiver fixed to a lower face of the sleeve, the thrust receiver supporting the thrust direction of the shaft, and sealing a lubricant, the lubricant being filled in a sealed space formed by the lower face of the sleeve and the thrust receiver, wherein a spiral groove that is narrower in groove width and shallower in groove depth than the herringbone groove and that is oriented in the thrust receiver direction in the rotation direction of the shaft is provided on the inner periphery wall face of the sleeve so as to be superimposed on a face identical to a face on which the herringbone groove is formed.

The previously described hydrodynamic bearing device is featured in that only a spiral groove that is slightly greater in diameter than a spiral groove on the inner periphery wall face of the sleeve is provided on the sleeve inner periphery wall face in the vicinity of the sleeve opening, the spiral groove being wider and deeper than the spiral groove on the sleeve inner periphery wall face, the spiral groove being oriented to the direction of the thrust receiver in the rotation direction of the shaft, and further, a large diameter peripheral groove section (oil stop) is provided between the sleeve inner periphery wall face in the vicinity of the sleeve opening and the sleeve inner periphery wall face on which the herringbone groove is formed.

According to the present invention, there can be provided a hydrodynamic bearing device, wherein only a spiral groove that is slightly greater in diameter than a spiral groove on the inner periphery wall face of the sleeve is provided on the sleeve inner periphery wall face in the vicinity of the sleeve opening, the spiral groove being wider and deeper than the spiral groove on the sleeve inner periphery wall face, the spiral groove being oriented to the direction of the thrust receiver in the rotation direction of the shaft, and further, a large diameter peripheral groove section is provided between the sleeve inner periphery wall face in the vicinity of the sleeve opening and the sleeve inner periphery wall face on which the herringbone groove is formed.

Further, the above described hydrodynamic bearing device is featured in that the lubricant is a fluorine based lubricating oil, the lubricating oil being injected to the vicinity of the sleeve opening.

As has been described above, according to the present invention, there can be provided a hydrodynamic bearing device (dynamic pressure bearing device) capable of reliably preventing the evaporation and leakage of a lubricant in order to improve the reliability of a hydrodynamic bearing for a thin motor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrodynamic bearing device comprising:

a shaft;

a sleeve rotatably supporting said shaft, wherein a herringbone groove is formed at a predetermined part of an inner periphery wall face of said sleeve; and a thrust receiver supporting a thrust side of said shaft fixed to a lower face of said sleeve, thereby sealing predetermined lubricant;

wherein a spiral groove which is narrower in groove width and shallower in depth than said herringbone groove, and which is oriented to said thrust receiver in a rotation direction of said shaft, is formed on an inner periphery wall face of said sleeve.

2. A hydrodynamic bearing device according to claim 1, wherein said spiral groove is formed over the entire inner periphery wall face of said sleeve.

3. A hydrodynamic bearing device according to claim 1, wherein said spiral groove is a first spiral groove, and wherein a second spiral groove, that is narrower in groove width and shallower in depth than said herringbone groove, and that is oriented at an opening end direction of said sleeve in the rotation direction of said shaft, is further formed on said sleeve inner periphery wall face.

4. A hydrodynamic bearing device according to claim 1, wherein a large diameter peripheral groove is formed in a vicinity of an opening end of said sleeve, and in an inner diameter of said sleeve, an inner diameter of an opening end side close to the large diameter peripheral groove is greater than that of said thrust receiver side.

5. A hydrodynamic bearing device according to claim 1, wherein said herringbone groove and said spiral groove are formed to be superimposed on said sleeve inner periphery wall face.

6. A hydrodynamic bearing device according to claim 5, wherein said spiral groove is a first spiral groove, and wherein a second spiral groove, that is narrower in groove width and shallower in depth than said herringbone groove, and that is oriented at an opening end direction of said sleeve in the rotation direction of said shaft, is further formed on said sleeve inner periphery wall face.

7. A hydrodynamic bearing device according to claim 5, wherein a large diameter peripheral groove is formed in a vicinity of an opening end of said sleeve, and in an inner diameter of said sleeve, an inner diameter of an opening end side close to the large diameter peripheral groove is greater than that of said thrust receiver side.

8. A hydrodynamic bearing device according to claim 5, wherein said spiral groove is formed over the entire inner periphery wall face of said sleeve.

9. A hydrodynamic bearing device according to claim 8, wherein a large diameter peripheral groove is formed in a vicinity of an opening end of said sleeve, and in an inner diameter of said sleeve, an inner diameter of an opening end side close to the large diameter peripheral groove is greater than that of said thrust receiver side.

10. A hydrodynamic bearing device according to claim 8, wherein said spiral groove is a first spiral groove, and wherein a second spiral groove, that is narrower in groove width and shallower in depth than said herringbone groove, and that is oriented at an opening end direction of said sleeve in the rotation direction of said shaft, is further formed on said sleeve inner periphery wall face.

11. A hydrodynamic bearing device according to claim 10, wherein a large diameter peripheral groove is formed in a vicinity of an opening end of said sleeve, and in an inner diameter of said sleeve, an inner diameter of an opening end side close to the large diameter peripheral groove is greater than that of said thrust receiver side.

12. A hydrodynamic bearing device according to claim 11, wherein, in said first spiral groove, a groove at the opening end side is wider and deeper than that at said thrust receiver side of the large diameter peripheral groove.

* * * * *